US010093173B1

(12) United States Patent
Frayer et al.

(10) Patent No.: US 10,093,173 B1
(45) Date of Patent: Oct. 9, 2018

(54) ACTIVE GRILLE SHUTTER SYSTEM WITH LOUVER COMPENSATION FEATURE (71) Applicant: SRG Global Inc., Troy, MI (US)

(72) Inventors: Rob Frayer, Huntington Woods, MI (US); Kurt Meier, Shelby Township, MI (US); Kim Wilkinson, Dexter, MI (US); Brian Przyjacielski, Shelby Township, MN (US)

(73) Assignee: SRG Global Inc., Troy, MI (US)

( * ) Notice: Subject to any disclaimer, the term of this patent is extended or adjusted under 35 U.S.C. 154(b) by 0 days.

(21) Appl. No.: 15/660,030

(22) Filed: Jul. 26, 2017

(51) Int. Cl.
*B60K 11/08* (2006.01)

(52) U.S. Cl.
CPC .................... *B60K 11/085* (2013.01)

(58) Field of Classification Search
CPC ....... B60K 11/085; B60K 11/08; Y02T 10/88; F01P 2031/00; F01P 7/10; B60R 7/10; B60R 2019/525; B62D 35/008
USPC ........................................................ 180/68.1
See application file for complete search history.

(56) References Cited

U.S. PATENT DOCUMENTS

| | | | | |
|---|---|---|---|---|
| 2,037,411 A * | 4/1936 | Fay | ........................ | E05F 1/1016 16/76 |
| 2,533,083 A * | 12/1950 | Blackburn | ................ | A47G 1/21 24/338 |
| 2,965,014 A * | 12/1960 | Lowery | .................... | F24F 11/76 454/256 |
| 4,006,893 A * | 2/1977 | Spencer | .................. | B60G 11/14 254/10.5 |
| 8,136,487 B2 * | 3/2012 | Bernt | .................... | B60K 11/085 123/41.05 |
| 8,973,607 B2 * | 3/2015 | Schwarz | .............. | B60K 11/085 137/601.08 |
| 9,163,852 B2 * | 10/2015 | Crane | .................. | B60K 11/085 |
| 9,233,605 B2 * | 1/2016 | Hijikata | ............... | B60K 11/085 |
| 9,254,742 B2 * | 2/2016 | Chappex | .............. | B60K 11/085 |
| 9,333,850 B2 * | 5/2016 | Ruppert | .................. | B60R 19/52 |
| 9,533,565 B2 * | 1/2017 | Elliott | .................. | B60K 11/085 |
| 9,573,458 B2 * | 2/2017 | Manhire | .............. | B60K 11/085 |
| 9,828,036 B2 * | 11/2017 | Frayer | .................. | B62D 25/082 |
| 9,855,981 B1 * | 1/2018 | Dunford | ................ | B62D 35/00 |
| 2006/0073781 A1 * | 4/2006 | Mochizuki | ........... | B60H 1/3421 454/152 |
| 2010/0071977 A1 * | 3/2010 | Ritz | ..................... | B60K 11/085 180/68.1 |
| 2010/0243352 A1 * | 9/2010 | Watanabe | ............ | B60K 11/085 180/68.1 |

(Continued)

*Primary Examiner* — James A Shriver, II
*Assistant Examiner* — Brian L Cassidy (57) ABSTRACT

An active grille shutter (AGS) system for a vehicle comprises a housing defining at least one opening, a set of louvers disposed in the at least one opening, wherein a first louver of the set of louvers has a rotational offset with respect to a second louver of the set of louvers, and a louver compensation system connected between an actuator system of the AGS system and at least one of the first and second louvers, the louver compensation system comprising a first rotationally flexible member, wherein the actuator system is configured to rotatably drive the first and second louvers, and wherein the first rotationally flexible member rotatably flexes to compensate for the rotational offset. A grille assembly of the vehicle and/or a side vent assembly of the vehicle could incorporate the AGS system.

17 Claims, 4 Drawing Sheets

(56) References Cited

U.S. PATENT DOCUMENTS

| | | | | |
|---|---|---|---|---|
| 2011/0048691 | A1* | 3/2011 | Shin | F01P 7/12 165/299 |
| 2011/0247779 | A1* | 10/2011 | Charnesky | B60K 11/085 165/41 |
| 2012/0110909 | A1* | 5/2012 | Crane | B60K 11/085 49/70 |
| 2012/0119059 | A1* | 5/2012 | Crane | B60K 11/085 248/674 |
| 2013/0001454 | A1* | 1/2013 | Schwarz | B60K 11/085 251/304 |
| 2013/0012115 | A1* | 1/2013 | Schwarz | B60K 11/085 454/155 |
| 2013/0081785 | A1* | 4/2013 | Yoo | B60K 11/085 165/96 |
| 2013/0092463 | A1* | 4/2013 | Hori | B60K 11/085 180/68.1 |
| 2013/0146375 | A1* | 6/2013 | Lee | F01P 7/10 180/68.1 |
| 2013/0220577 | A1* | 8/2013 | Bignon | B60K 11/085 165/98 |
| 2013/0284401 | A1* | 10/2013 | Kiener | F01P 7/02 165/98 |
| 2014/0094104 | A1* | 4/2014 | Manhire | B60K 11/085 454/152 |
| 2014/0170960 | A1* | 6/2014 | Vacca | B60K 11/085 454/333 |
| 2014/0174220 | A1* | 6/2014 | Jeong | B60K 11/085 74/89.14 |
| 2014/0216834 | A1* | 8/2014 | Elliott | B60K 11/085 180/68.1 |
| 2014/0295749 | A1* | 10/2014 | Hijikata | B60K 11/085 454/256 |
| 2014/0308890 | A1* | 10/2014 | Schneider | F24F 13/1426 454/335 |
| 2014/0335778 | A1* | 11/2014 | Takanaga | F24F 7/00 454/333 |
| 2014/0345400 | A1* | 11/2014 | Bourqui | F16H 19/08 74/89.16 |
| 2014/0346809 | A1* | 11/2014 | Lee | B60K 11/085 296/180.5 |
| 2015/0072604 | A1* | 3/2015 | Yoo | B60K 11/085 454/152 |
| 2015/0231962 | A1* | 8/2015 | Ruppert | B60K 11/085 180/68.1 |
| 2015/0274002 | A1* | 10/2015 | Vacca | B60K 11/085 180/68.1 |
| 2016/0193911 | A1* | 7/2016 | Thullier | B60K 11/085 454/155 |
| 2016/0236563 | A1* | 8/2016 | Ruppert | B60K 11/085 |
| 2016/0272060 | A1* | 9/2016 | Edwards | B60K 11/085 |
| 2017/0001514 | A1* | 1/2017 | Watari | B60R 19/52 |
| 2017/0043659 | A1* | 2/2017 | Vacca | B60K 11/08 |
| 2017/0050509 | A1* | 2/2017 | Aizawa | B60K 11/085 |
| 2017/0050510 | A1* | 2/2017 | Manhire | B60K 11/085 |
| 2017/0066319 | A1* | 3/2017 | Knauer | B60K 11/085 |
| 2017/0144710 | A1* | 5/2017 | Frayer | B62D 25/082 |
| 2017/0248066 | A1* | 8/2017 | Wolf | B60K 11/085 |
| 2017/0326967 | A1* | 11/2017 | Brueckner | B60K 11/085 |
| 2017/0326970 | A1* | 11/2017 | Schoening | B60K 11/04 |
| 2017/0326971 | A1* | 11/2017 | Cosmo | B60R 19/52 |

* cited by examiner

ACTIVE GRILLE SHUTTER SYSTEM WITH LOUVER COMPENSATION FEATURE

FIELD

The present disclosure generally relates to vehicle airflow control and, more particularly, to an active grille shutter (AGS) system with a louver compensation feature.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A vehicle can be propelled by a powertrain that generates drive torque. In some implementations, the powertrain can be arranged in a front compartment of the vehicle underneath a hood. During operation, the powertrain can generate a large amount of heat. To mitigate overheating of the powertrain and potential damage to other components in the powertrain compartment, a cooling system can be implemented. One example component of the cooling system is a heat transfer device, such as a radiator. Air can flow through openings at a front of the compartment to cool the radiator. These openings can also be referred to as a grille assembly of the vehicle. An active grille shutter (AGS) system can be implemented to control airflow through the grille assembly. Example uses of the AGS system include controlling temperature in the powertrain compartment and improving vehicle aerodynamics for increased vehicle fuel economy.

SUMMARY

According to one aspect of the present disclosure, an active grille shutter (AGS) system for a vehicle is presented. In one exemplary implementation, the AGS system comprises a housing defining at least one opening; a set of louvers disposed in the at least one opening, wherein a first louver of the set of louvers has a rotational offset with respect to a second louver of the set of louvers; and a louver compensation system connected between an actuator system of the AGS system and at least one of the first and second louvers, the louver compensation system comprising a first rotationally flexible member, wherein the actuator system is configured to rotatably drive the first and second louvers, and wherein the first rotationally flexible member rotatably flexes to compensate for the rotational offset.

In some implementations, the first rotationally flexible member is part of the first louver, and wherein the actuator system is connected to the first louver. In some implementations, the first rotationally flexible member is an end portion of the first louver and defines an elastic region of a material of the member having a rotational flexibility within a range such that the first and second louvers are movable across a desired operating range. In some implementations, the louver compensation system is connected between the actuator system and each louver of the set of louvers, wherein the louver compensation system comprises a plurality of first rotationally flexible members such that each louver set of louvers has one of the plurality of first rotationally flexible members integrated therewith.

In some implementations, the first rotationally flexible member is a separate device that is connected between at least one of the first and second louvers and the actuator system. In some implementations, the AGS system further comprises a linkage connected between the actuator system and at least one of the first and second louvers. In some implementations, the first rotationally flexible member is part of the linkage. In some implementations, the actuator system is configured to drive one of the first and second louvers via the other of the first and second louvers and the linkage. In some implementations, the actuator system is configured to drive both of the first and second louvers via the linkage.

In some implementations, the set of louvers comprises distinct first and second sets of louvers, wherein the first set of louvers comprises the first louver and the second set of louvers comprises the second louver, wherein the actuator system comprises a central actuator disposed between the first and second louvers, and wherein the first rotationally flexible member comprises: a first rigid connecting portion connected to the first louver; a second rigid connecting portion connected to the central actuator; and a first rotationally flexible portion connected between the first and second rigid connecting portions. In some implementations, the first and second rigid connecting portions and the first rotationally flexible portion collectively form a plastic component defining at least a desired elastic deformation. In some implementations, the first and second rigid connecting members are formed during one shot of a multi-shot injection molding process and the first rotationally flexible portion is formed during another shot of the multi-shot injection molding process.

In some implementations, the first and second rigid connecting members and the first rotationally flexible member collectively form a flexible spring steel member that is overmolded by a plastic. In some implementations, the first rotationally flexible portion comprises a torsion spring. In some implementations, the louver compensation system further comprises a second rotationally flexible member that is a separate device connected between the second louvers and the actuator system. In some implementations, the second rotationally flexible member comprises: a third rigid connecting portion connected to the second louver; a fourth rigid connecting portion connected to the central actuator; and a second rotationally flexible portion connected between the third and fourth rigid connecting portions.

In some implementations, the first rotationally flexible member rotatably flexes such that the set of louvers collectively form a flush surface in a closed position of the AGS system. According to another aspect of the present disclosure, a radiator grille assembly of the vehicle is presented. In one exemplary implementation, the radiator grille assembly comprises the AGS system described above. According to yet another aspect of the present disclosure, a side vent assembly of the vehicle is presented. In one exemplary implementation, the side vent assembly comprises the AGS system described above.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

As previously mentioned, an active grille shutter (AGS) system can be implemented to control airflow through a grille assembly of a vehicle. In some implementations, the AGS system includes one or more distinct sets of louvers. For example, a grille assembly of the vehicle may include distinct first and second sets of louvers on opposing sides of a center point, such as a central radome depicting a vehicle emblem, symbol, logo, or the like. It will be appreciated that there can also be distinct upper/lower sets of louvers corresponding to distinct upper/lower grille assemblies (e.g., two distinct upper sets of louvers and two distinct lower sets of louvers). The louvers can also be arranged either horizontally or vertically. It will be appreciated that the AGS system could be (i) fully-integrated such that the louvers form a visible A-surface of the grille assembly or (ii) semi-integrated or standalone such that the louvers form a partially or fully hidden B-surface of the grille assembly.

The distinct sets of louvers can be driven in a variety of different ways. In some cases, however, one particular louver or an entire set of louvers may be driven to a fully closed position, but other louvers may only be driven to a partially closed position. This can be due to a variety of factors, such as manufacturing tolerances, shifting/movement of components, or material wear. When one set of louvers is intended to be fully closed but remains partially open, vehicle aerodynamics can be negatively impacted. Similarly, when one set of louvers is intended to be fully or partially open but remains fully closed, airflow into the powertrain compartment can be negatively impacted. Having one set of louvers partially open while another set of louvers is fully closed can negatively affect aerodynamic performance and/or is not visually appealing, which could be particularly undesirable for a fully-integrated AGS system where the louvers form the visible A-surface of the grille assembly. Accordingly, an AGS system with a louver compensation feature is presented.

Figure 1:
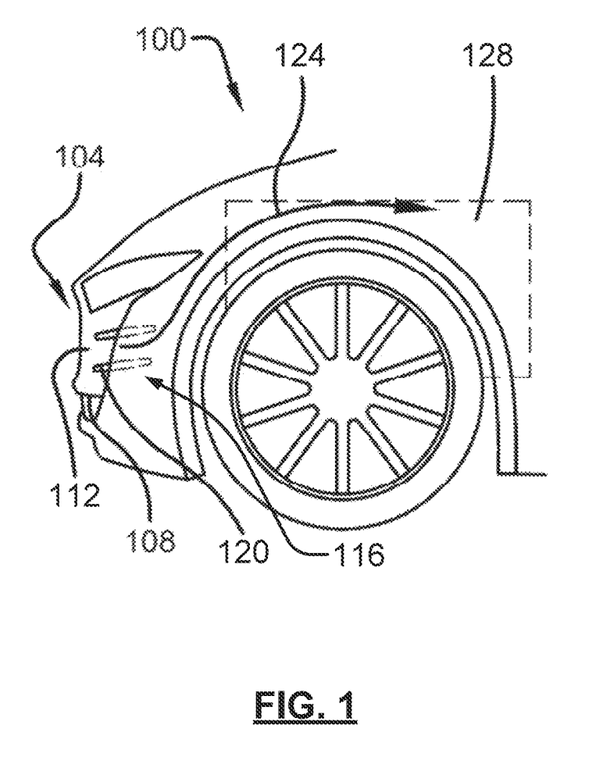
FIG. 1 depicts an example vehicle having an example active grille shutter (AGS)

Referring now to FIG. 1, a front portion of an example vehicle 100 is illustrated. The vehicle 100 can include a grille assembly 104. The grille assembly 104 can include a housing 108 defining one or more openings 112 through which air can flow. The grille assembly 104 may include a standalone, semi-integrated, or fully-integrated AGS system 116 comprising one or more distinct sets of louvers 120 In some implementations, these louvers 120 are distinct from fixed or stationary grille bars (not shown) that are also disposed in the housing 108, such as for decorative or stylistic purposes. Air can flow through the opening(s) 112 and through the louvers 120 via an air path 124 and into a powertrain compartment 128 (e.g., an engine compartment) of the vehicle 100. For example, this airflow can cool components of the powertrain compartment 124, such as a radiator.

Figure 2A:
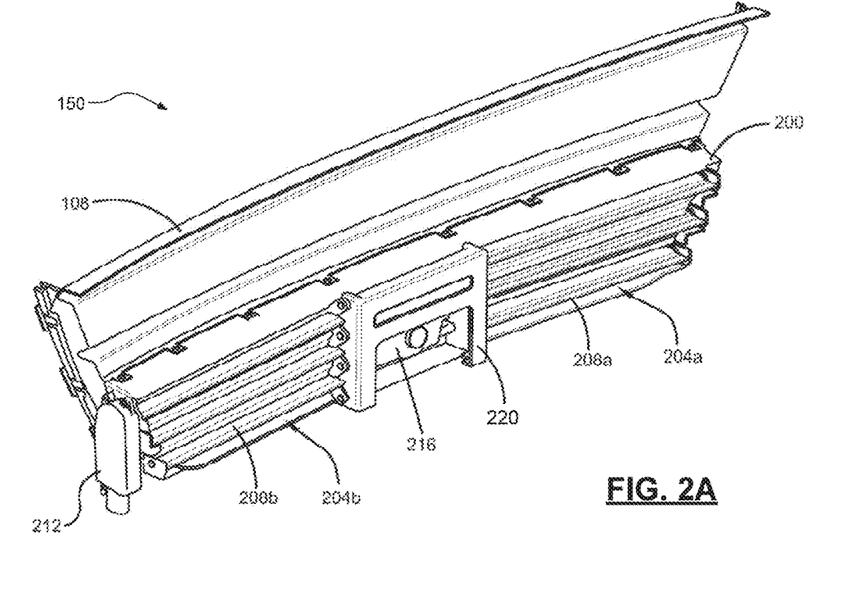
FIG. 2A depicts an example AGS system having one or more end actuators.

Referring now to FIG. 2A, a rear view of an example end actuator driven AGS system 150 is illustrated. For example, this configuration 150 and the other configurations discussed below could be implemented for the AGS system 116 disposed in the housing 108 (see FIG. 1). The AGS system 150 can include a housing 200 that defines first and second distinct openings 204a and 204b. First and second distinct sets of louvers 208a and 208b can be disposed within the first and second openings 204a and 204b, respectively. It will be appreciated that each set of louvers 208a, 208b could include either a single louver or multiple louvers. An actuator system comprising an actuator or set of actuators 212 can be configured at an end of the system 150 and can be configured to drive and thereby selectively open/close the first and second sets of louvers 208a, 208b. Examples of the actuator(s) 212 include, but are not limited to, electric motors, drive shafts, drive gears, and combinations thereof.

When a single actuator or set of actuators 212 is implemented as shown, the actuator(s) 212 can drive the second set of louvers 208b, which in turn can drive the first set of louvers 208 (e.g., via a linkage 216, such as a straight bar linkage, disposed in a central housing 220). As previously mentioned, this could result in the first and second sets of louvers 208a, 208b being offset from each other. In some implementations, the set of actuators 212 can include different sets of end actuators 212 configured to drive the first and second sets of louvers 208a, 208b. In this manner, the first and second sets of louvers 208a, 208b could be driven independently of each other as opposed to being driven uniformly. Implementing separate actuator(s) 212 for each set of louvers 208a, 208b, however, can increase system costs and/or control complexity.

Figure 2B:
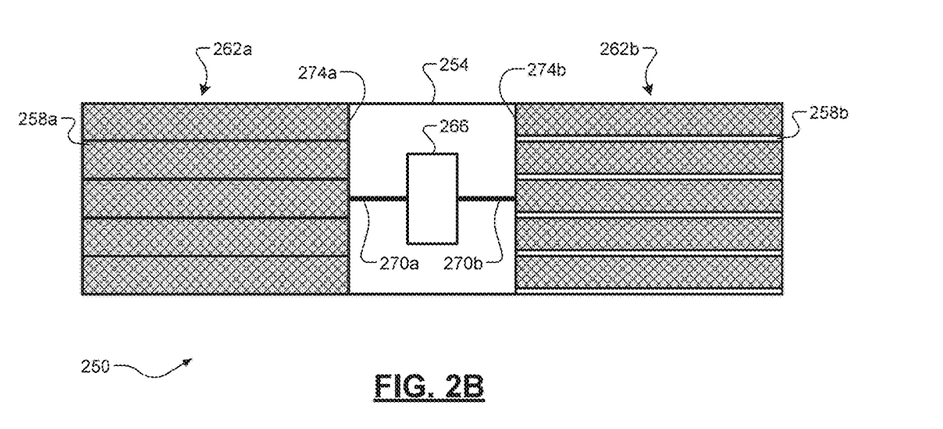
FIG. 2B depicts an example AGS system having a central actuator and a rigid drive link.

Referring now to FIG. 2B, a view of an example central actuator driven AGS system 250 is illustrated. The system 250 can comprise a housing 254 that defines distinct first and second openings 258a, 258b. Distinct first and second sets of louvers 262a, 262b can be disposed within the first and second openings 258a, 258b. A central actuator system or single central actuator 266 can be disposed between the first and second openings 258a, 258b. The central actuator 266 can be physically coupled to the first and second sets of louvers 262a, 262b via first and second rigid connecting members 270a, 270b. While two rigid connecting members 270a, 270b are shown, it will be appreciated that a single rigid connecting member could be implemented with the central actuator 266 disposed there along. The connecting members 270a, 270b could also be part of the respective louvers 262a, 262b and the louvers 262a, 262b could then be directly connected to the central actuator 266. The term "rigid" as used herein refers to a degree of rigidity greater than or a degree of rotational/torsional flexibility less than a particular threshold that would enable the first and second sets of louvers 258a, 258b to compensate for an offset.

The central actuator 266 is configured to drive the first and second sets of louvers 258a, 258b between a fully open position and a fully closed position, along with partially open/closed positions therebetween. In some implementations, the rigid connecting members 270a, 270b are directly coupled to the first and second sets of louvers 258a, 258b. In other implementations, the rigid connecting members 270a, 270b are connected to the first and second sets of louvers 270a, 270b via linkage 274a, 274b. As shown, the first set of louvers 262a has been driven by the central actuator 266 to a fully closed position. As can be seen, however, the second set of louvers 262b remains partially open. The result is airflow through the second opening 258b, but little or no airflow through the first opening 258a, which affects vehicle aerodynamic performance. As previously mentioned, this offset between the first and second sets of louvers 262a, 262b can be due to manufacturing tolerances or, over time, component shifting/movement and/or material wear/deformation.

Figure 3A:
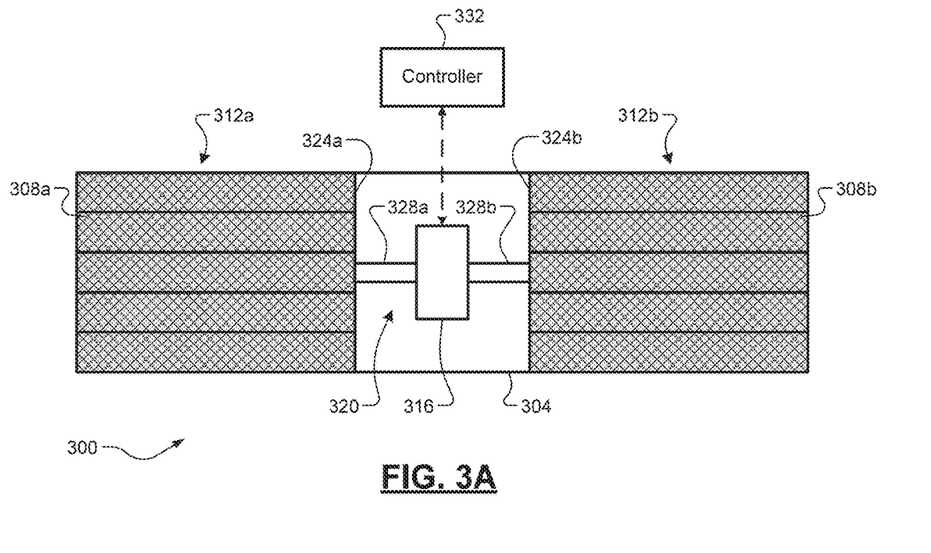
FIG. 3A depicts an example AGS system having a central actuator and a louver compensation system according to some implementations of the present disclosure.

Referring now to FIG. 3A, a view of an example central actuator driven AGS system 300 having a louver compensation feature is illustrated. As discussed above, a rigid drive member is incapable of compensating for rotational offset between two sets of louvers. Therefore, a louver compensation system can be implemented that incorporates some degree of rotational or torsional flexibility between a central actuator and the two sets of louvers to compensate for the offset. In FIG. 3A, the AGS system 300 can comprise a housing 304 defining distinct first and second openings 308a, 308b. First and second distinct sets of louvers 312a, 312b can be disposed in the first and second openings 308a, 308b. The central actuator 316 can be physically coupled to the first and second sets of louvers 312a, 312b via a louver compensation system 320 and, optionally, via linkage 324a, 324b.

In one implementation, the louver compensation system 320 can comprise a separate device that is distinct from the louvers 312 and any linkage. In this implementation, the separate device can include two distinct rotationally or torsionally flexible members 328a, 328b each connected to the central actuator 316 and a respective one of the first and second sets of louvers 312a, 312b. While two rotationally flexible members 328a, 328b are illustrated, it will be appreciated that one rotationally flexible member could be implemented with the central actuator 316 disposed there along. Examples of the rotationally flexible members 328a, 328b include, but are not limited to, a plastic component defining at least a desired elastic deformation, a flexible spring steel member (e.g., overmolded by a plastic), and a torsion spring. It will be appreciated that only a portion of each member 328a, 328b may be rotationally or rotatably flexible. In other words, there may be a rotationally or rotatably flexible portion and one or two non-flexible or rigid connecting portions, such as for the connections to the central actuator 316 and/or the louvers 312a, 312b.

Figure 3B:
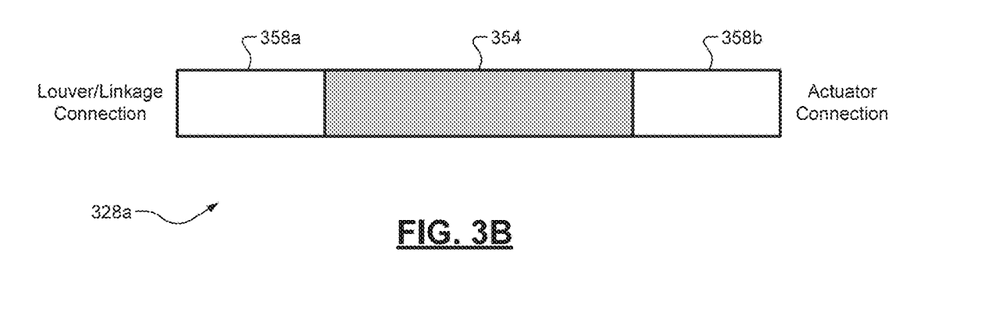
FIG. 3B depicts an example flexible drive link of one configuration for the louver compensation system of FIG. 3A.

FIG. 3B, for example, illustrates an example configuration for the first rotationally flexible member 328a. As shown, the member 328a can include a rotationally flexible portion 354 with rotationally non-flexible or rigid connecting portions 358a, 358b on each side. These non-flexible or rigid connecting portions 358a, 358b can connect to louvers 312a (via optional linkage 324a) and the central actuator 316, respectively. Another example of the rotationally flexible member 328a, therefore, can formed using a multi-shot injection molding process. For example, a first shot can be used to form one of the portions 354 and 358a/358b and a subsequent second shot can be used to form the other of the portions 354 and 358a/358b. The same or similar configuration could be applied between the central actuator 316 and the other louvers 312b (e.g., third/fourth rigid connecting portions and another rotationally flexible portion).

In other implementations, the louver compensation system 320 can be integrated into existing components. For example, in one implementation, a rotationally flexible member can be integrated as part of one or more of the louvers, which can then be driven by the actuator system directly. Alternatively, for example, in another implementation, a rotationally flexible member can be integrated as part of the linkage, either for a centrally-driven system or an end-driven system. By integrating the rotationally flexible member(s) into existing componentry, costs may be reduced compared to having to manufacture additional devices for the louver compensation system 320. For example, the rotationally flexible member(s) could be formed during the formation of the louvers/linkage, such as during a different shot of a multi-shot injection molding process.

Figure 4A:
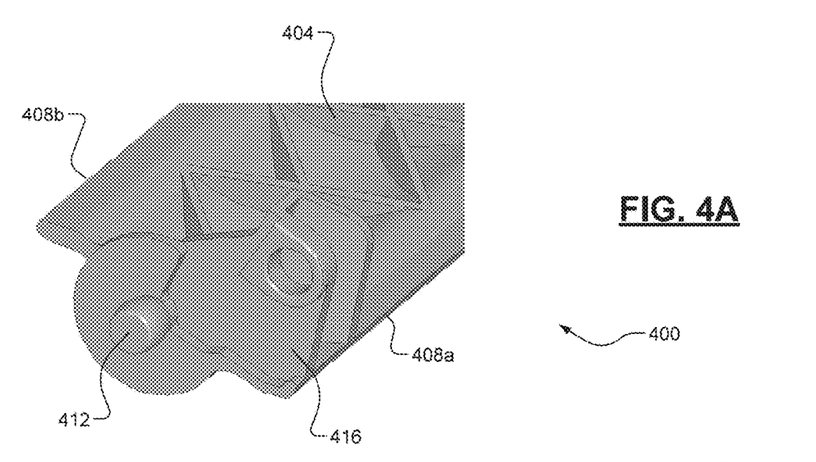
FIG. 4A depicts an example rigid connecting member coupled to a louver.

Alternatively, for example, the rotationally flexible member(s) could be formed at the same time as the formation of the louver/linkage, i.e., in a single shot injection molding process. As previously discussed, the flexibility feature could be incorporated into each louver of a set of louvers (e.g., beneficial for integrated/visible systems) or only into a single drive louver. The stress/strain in the part should also be optimized to achieve the desired displacement and operate within an elastic deformation range of the material. Elastic deformation refers to a temporary deformation of a material's shape that is self-reversing after removing the force or load. Elastic deformation alters the shape of the material upon the application of a force within its elastic limit. FIG. 4A, for example, illustrates a system 400 comprising a louver 404 defining first and second edges 408a, 408b. The louver 404 is configured to rotatably pivot about pivot point 412. A rigid connecting member 416 is coupled to the louver 404 and is configured to be rotatably driven by the linkage/actuator. This connecting member 416 is rigid because it is coupled to a large portion of the louver (e.g., from a middle/central portion all the way to the first edge 408a). In other words, the rigidity of the connecting member 416 prevents it from rotationally flexing enough to meet certain objectives, e.g., to ensure full closure of the louvers 404.

Figure 4B:
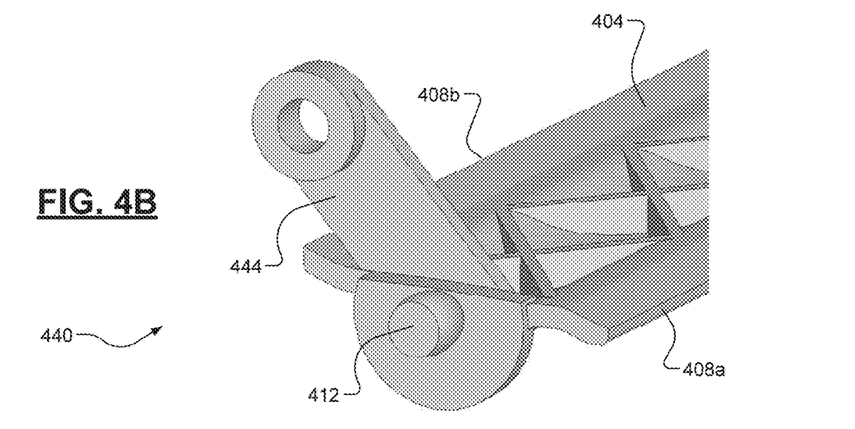
FIGS. 4B-4C depict example flexible connecting members coupled to a louver according to some implementations of the present disclosure.
Figure 4C:
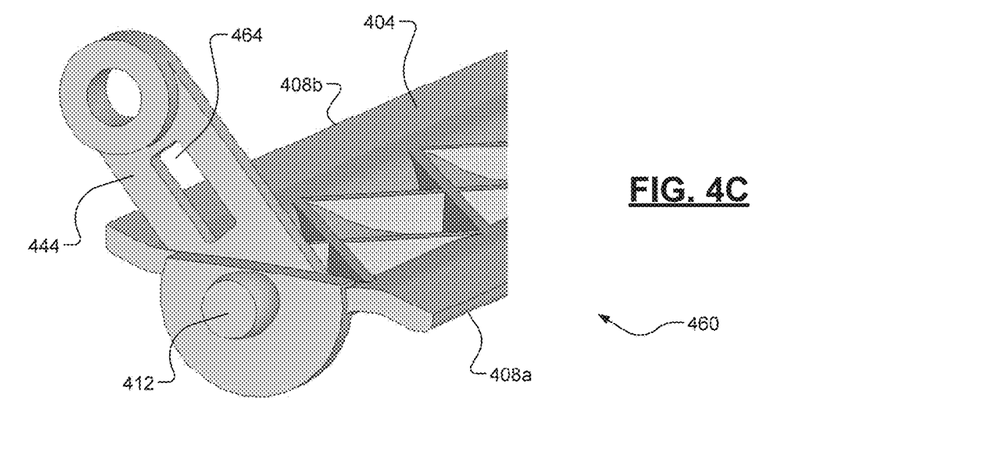

FIGS. 4B-4C, in contrast, illustrate systems 440, 460 comprising a connecting member 444 that is rotationally flexible. As shown, the connecting member 444 is coupled to a lesser portion of the louver 404 (e.g., only a middle/central portion) and is thus more rotationally flexible than the rigid connecting member 416 of FIG. 4A. In FIG. 4B, the rotationally flexible connecting member 444 is solid (except for an aperture for connecting to the linkage/actuator). In FIG. 4C, on the other hand, the rotationally flexible connecting member 444 further defines an aperture 464 to further increase its rotational flexibility. This aperture 464 can also be described as a relief slot in that it is specifically designed to allow rotational deformation within the elastic region of the material stress/strain curve. In some implementations, the aperture or relief slot 464 can be designed to allow rotational flexibility in one direction (e.g., closing) while limiting rotational flexibility in the other direction (e.g., opening). As mentioned above, the overall stress/strain of the rotationally flexible connecting member 444 should be designed such that it is able to rotationally flex over a desired operating range, e.g., to ensure full opening/closing of the louvers 404. Mechanical features and/or hard stops can optionally be added to limit the amount of deformation to be within the elastic region of the material.

Referring back to FIG. 3A, a controller 332 can be implemented to control the central actuator 316 according to a particular control scheme. This control scheme may include, for example, closing/opening the louvers 312a/312b based on a temperature of a coolant inside the powertrain compartment 124 and/or based on vehicle speed. This control scheme can further control the central actuator 316 to drive the sets of louvers 312a/312b with a degree of rotational force (e.g., to a desired position) such that one set of the louvers 312a, 312b are fully open/closed and the other set of louvers 312a, 312b is also fully open/closed by enabling the particular set of louvers 312a or 312b to rotationally flex to compensate for the offset. The controller 332, for example, may store (e.g., on a non-volatile memory) parameters of the louver compensation system 320 such that the controller 316 knows how to drive the central actuator 316 to compensate for the rotational offset between the first and second sets of louvers 312a, 312b. It will be appreciated that the controller 316 could be similarly implemented for controlling the actuator(s)/louvers of the other system configurations discussed herein, e.g., systems 440, 460 of FIGS. 4B-4C.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An active grille shutter (AGS) system for a vehicle, the AGS system comprising:
    a housing defining at least one opening;
    a set of louvers disposed in the at least one opening, wherein a first louver of the set of louvers has a rotational offset with respect to a second louver of the set of louvers; and
    a louver compensation system connected between an actuator system of the AGS system and at least one of the first and second louvers, the louver compensation system comprising a first rotationally flexible member,
    wherein the actuator system is configured to rotatably drive the first and second louvers, and wherein the first rotationally flexible member rotatably flexes to compensate for the rotational offset,
    wherein the first rotationally flexible member is an end portion of the first louver and defines an elastic region of a material of the member having a rotational flexibility within a range such that the first and second louvers are movable across a desired operating range, and
    wherein the louver compensation system is connected between the actuator system and each louver of the set of louvers, wherein the louver compensation system comprises a plurality of first rotationally flexible members such that each louver has one of the plurality of first rotationally flexible members integrated therewith.

2. The AGS system of claim 1, wherein the first rotationally flexible member is part of the first louver, and wherein the actuator system is connected to the first louver.

3. The AGS system of claim 1, wherein the first rotationally flexible member is distinct from the first the first and second louvers and the actuator system and is connected between at least one of the first and second louvers and the actuator system.

4. The AGS system of claim 3, further comprising a linkage connected between the actuator system and at least one of the first and second louvers.

5. The AGS system of claim 4, wherein the first rotationally flexible member is part of the linkage.

6. The AGS system of claim 5, wherein the actuator system is configured to drive one of the first and second louvers via the other of the first and second louvers and the linkage.

7. The AGS system of claim 5, wherein the actuator system is configured to drive both of the first and second louvers via the linkage.

8. The AGS system of claim 1, wherein the set of louvers comprises distinct first and second sets of louvers, wherein the first set of louvers comprises the first louver and the second set of louvers comprises the second louver, wherein the actuator system comprises a central actuator disposed between the first and second louvers, and wherein the first rotationally flexible member comprises:
 a first rigid connecting portion connected to the first louver;
 a second rigid connecting portion connected to the central actuator; and
 a first rotationally flexible portion connected between the first and second rigid connecting portions.

9. The AGS system of claim 8, wherein the first and second rigid connecting portions and the first rotationally flexible portion collectively form a plastic component defining at least a desired elastic deformation.

10. The AGS system of claim 8, wherein the first and second rigid connecting members and the first rotationally flexible member collectively form a flexible spring steel member that is overmolded by a plastic.

11. The AGS system of claim 8, wherein the first rotationally flexible portion comprises a torsion spring.

12. The AGS system of claim 1, wherein the first rotationally flexible member rotatably flexes such that the set of louvers collectively form a flush surface in a closed position of the AGS system.

13. A radiator grille assembly of the vehicle, the radiator grille assembly comprising the AGS system of claim 1.

14. The radiator grille assembly of claim 13, wherein the AGS system is a fully-integrated with an outer surface of the radiator grille assembly.

15. An active grille shutter (AGS) system for a vehicle, the AGS system comprising:
 a housing defining at least one opening;
 a set of louvers disposed in the at least one opening, wherein a first louver of the set of louvers has a rotational offset with respect to a second louver of the set of louvers; and
 a louver compensation system connected between an actuator system of the AGS system and at least one of the first and second louvers, the louver compensation system comprising a first rotationally flexible member,
 wherein the actuator system is configured to rotatably drive the first and second louvers, and wherein the first rotationally flexible member rotatably flexes to compensate for the rotational offset,
 wherein the set of louvers comprises distinct first and second sets of louvers, wherein the first set of louvers comprises the first louver and the second set of louvers comprises the second louver, wherein the actuator system comprises a central actuator disposed between the first and second louvers, and wherein the first rotationally flexible member comprises:
 a first rigid connecting portion connected to the first louver;
 a second rigid connecting portion connected to the central actuator; and
 a first rotationally flexible portion connected between the first and second rigid connecting portions,
 wherein the first and second rigid connecting portions and the first rotationally flexible portion collectively form a plastic component defining at least a desired elastic deformation, and
 wherein the first and second rigid connecting members are formed during one shot of a multi-shot injection molding process and the first rotationally flexible portion is formed during another shot of the multi-shot injection molding process.

16. An active grille shutter (AGS) system for a vehicle, the AGS system comprising:
 a housing defining at least one opening;
 a set of louvers disposed in the at least one opening, wherein a first louver of the set of louvers has a rotational offset with respect to a second louver of the set of louvers; and
 a louver compensation system connected between an actuator system of the AGS system and at least one of the first and second louvers, the louver compensation system comprising a first rotationally flexible member,
 wherein the actuator system is configured to rotatably drive the first and second louvers, and wherein the first rotationally flexible member rotatably flexes to compensate for the rotational offset,
 wherein the set of louvers comprises distinct first and second sets of louvers, wherein the first set of louvers comprises the first louver and the second set of louvers comprises the second louver, wherein the actuator system comprises a central actuator disposed between the first and second louvers, and wherein the first rotationally flexible member comprises:
 a first rigid connecting portion connected to the first louver;
 a second rigid connecting portion connected to the central actuator; and
 a first rotationally flexible portion connected between the first and second rigid connecting portions, and
 wherein the louver compensation system further comprises a second rotationally flexible member that is distinct from the first and second louvers and the actuator system and is connected between the second louvers and the actuator system.

17. The AGS system of claim 16, wherein the second rotationally flexible member comprises:
 a third rigid connecting portion connected to the second louver;
 a fourth rigid connecting portion connected to the central actuator; and
 a second rotationally flexible portion connected between the third and fourth rigid connecting portions.

\* \* \* \* \*